US009104295B2

(12) United States Patent
Pallakoff et al.

(10) Patent No.: US 9,104,295 B2
(45) Date of Patent: Aug. 11, 2015

(54) SYSTEM AND METHOD FOR ORGANIZING USER INTERFACE FOR CATEGORIES OF RECENTLY USED DIGITAL MATERIAL

(75) Inventors: Matt Pallakoff, Mountain View, CA (US); Jeff Tycz, Palo Alto, CA (US); Jennifer Ng, San Francisco, CA (US); Josh Feldman, San Francisco, CA (US)

(73) Assignee: NOOK DIGITAL, LLC, New York, NY (US)

( * ) Notice: Subject to any disclaimer, the term of this patent is extended or adjusted under 35 U.S.C. 154(b) by 212 days.

(21) Appl. No.: 13/273,145

(22) Filed: Oct. 13, 2011

(65) Prior Publication Data

US 2012/0151331 A1 Jun. 14, 2012

Related U.S. Application Data

(60) Provisional application No. 61/407,006, filed on Oct. 26, 2010.

(51) Int. Cl.
*G06F 17/22* (2006.01)
*G06F 3/0482* (2013.01)
*G06F 3/0483* (2013.01)

(52) U.S. Cl.
CPC ............ *G06F 3/0482* (2013.01); *G06F 3/0483* (2013.01)

(58) Field of Classification Search
CPC ... G06F 3/0482; G06F 17/241; G06F 17/217; G06F 3/017; G06F 3/03545; G06F 3/0488; G06F 15/0291; G06F 3/0483; G06F 17/30994
See application file for complete search history.

(56) References Cited

U.S. PATENT DOCUMENTS

| 7,801,943 | B2 * | 9/2010 | Jystad et al. | 709/202 |
| 2003/0212786 | A1 * | 11/2003 | Jystad et al. | 709/224 |
| 2005/0097007 | A1 | 5/2005 | Alger et al. | |
| 2006/0119615 | A1 * | 6/2006 | Zhou et al. | 345/619 |
| 2007/0240079 | A1 * | 10/2007 | Flynt et al. | 715/810 |
| 2008/0205655 | A1 | 8/2008 | Wilkins et al. | |
| 2009/0119614 | A1 | 5/2009 | Tienvieri et al. | |
| 2010/0064258 | A1 | 3/2010 | Gorczowski et al. | |
| 2010/0122170 | A1 * | 5/2010 | Girsch et al. | 715/727 |
| 2011/0078585 | A1 * | 3/2011 | King et al. | 715/751 |

OTHER PUBLICATIONS

Thurrott et al. Excerpts of "Windows 7 Secrets". Copyright Date: Sep. 8, 2009.*
Tsirulnik; "Google brings books to mobile"; [online] Mobile Marketer, published Feb. 9, 2009 [retrieved from the Internet Jan. 28, 2012]; Retrieved from the internet <URL: http://www.mobilemarketer.com/cms/news/content/2601.html>, p. 1-2.

* cited by examiner

*Primary Examiner* — Maikhanh Nguyen
(74) *Attorney, Agent, or Firm* — Winston & Strawn LLP

(57) ABSTRACT

A system and method provides a user interface on an electronic device with a listing of the most recently used or viewed items that is organized by the category of item. A menu containing the most recently read items is separated into separate categories such as books and periodicals. The menu displays the most recently opened item in each of the categories. In this manner, one category will not dominate over the other categories on the menu.

12 Claims, 5 Drawing Sheets

TABLE 1

| | | | |
|---|---|---|---|
| Books: | Up to two lines for title. Truncate if necessary Author Name | Title (line 1) Title (line 2) Trunc... Author Name | Mastering the Art of French... Julia Child |
| | | Title (line 1) Author Name | Open Andre Agassi |
| Magazines: | Up to two lines for title. Truncate if necessary Date | Title (line 1) Title (line 2) Trunc... Date | The New York Time Book Re... April 2010 |
| | | Title (line 1) Date | PC Magazine April 2010 |
| Newspapers: | One line for title Truncate if necessary Publisher Name Date | Title (line 1) Title (line 2) Trunc... Date | The Dallas Morning News April 15, 2010 |
| | | Title (line 1) Date | The LA Times April 15, 2010 |
| Dates: | Monthly: April 2010 Weekly: April 15, 2010 Daily: April 15, 2010 | | |

FIGURE 4

SYSTEM AND METHOD FOR ORGANIZING USER INTERFACE FOR CATEGORIES OF RECENTLY USED DIGITAL MATERIAL

CROSS REFERENCE TO RELATED APPLICATION

This application claims benefit under 35 U.S.C. §119(e) from U.S. Provisional Patent application No. 61/407,006, filed on Oct. 26, 2010, the entirety of which is incorporated by reference herein.

FIELD OF THE INVENTION

The present invention generally relates to systems and methods for organizing user interfaces, and more particularly to systems and methods for organizing a user interface on a mobile electronic book reader.

BACKGROUND OF THE INVENTION

There are several conventional methods of displaying items such as files that were most recently used by a user. For example, word processors traditionally keep track of and are capable of displaying a list of the last few documents on which a user has worked. Web browsers are similarly capable of providing users with a list of the last few websites visited.

SUMMARY OF THE INVENTION

The present invention provides a user with a listing of the most recently used or viewed items that is organized by the category of item. In a preferred embodiment, the present invention is used in an electronic reader. The menu containing the most recently read items is broken down, by books and periodicals, or by books, newspapers and magazines. The menu displays the most recently read item in each of the categories. In this manner, one category will not dominate over the other categories.

For example, since a typical reader reads more periodicals than books during a given period, without the present invention, the menu of most recently read items would be dominated by the periodicals. Specifically, as most newspapers are read on a daily basis, the user's newspaper editions would dominate a "Most Recently Read" list, and the book she has not opened in more than two weeks would easily drop off the list.

By organizing the most recently read list by category, a user can quickly locate the items she has most recently read. For example, the book she has most recently read is found at the top of the Book category. The magazine she has read is at the top of the Magazine category. The newspaper she has most recently read is at the top of the Newspaper category. The file she has most recently looked at is at the top of the File category.

As appreciated by those skilled in the art, any number of categories can be established. Multifunctional devices can further include categories such as Music, Video, Audio books. Within music, sub-categories can be established, e.g., Rock, Rap, Blues or Show tunes. Within each of these categories, the most recently listened to material would appear at the top of the category or subcategory list.

BRIEF DESCRIPTION OF THE DRAWINGS

For the purposes of illustrating the present invention, there is shown in the drawings a form which is presently preferred, it being understood however, that the invention is not limited to the precise form shown by the drawing in which:

FIG. 4 is a Table illustrating formatting conventions for the display of digital content.

DETAILED DESCRIPTION OF THE INVENTION

Figure 1:
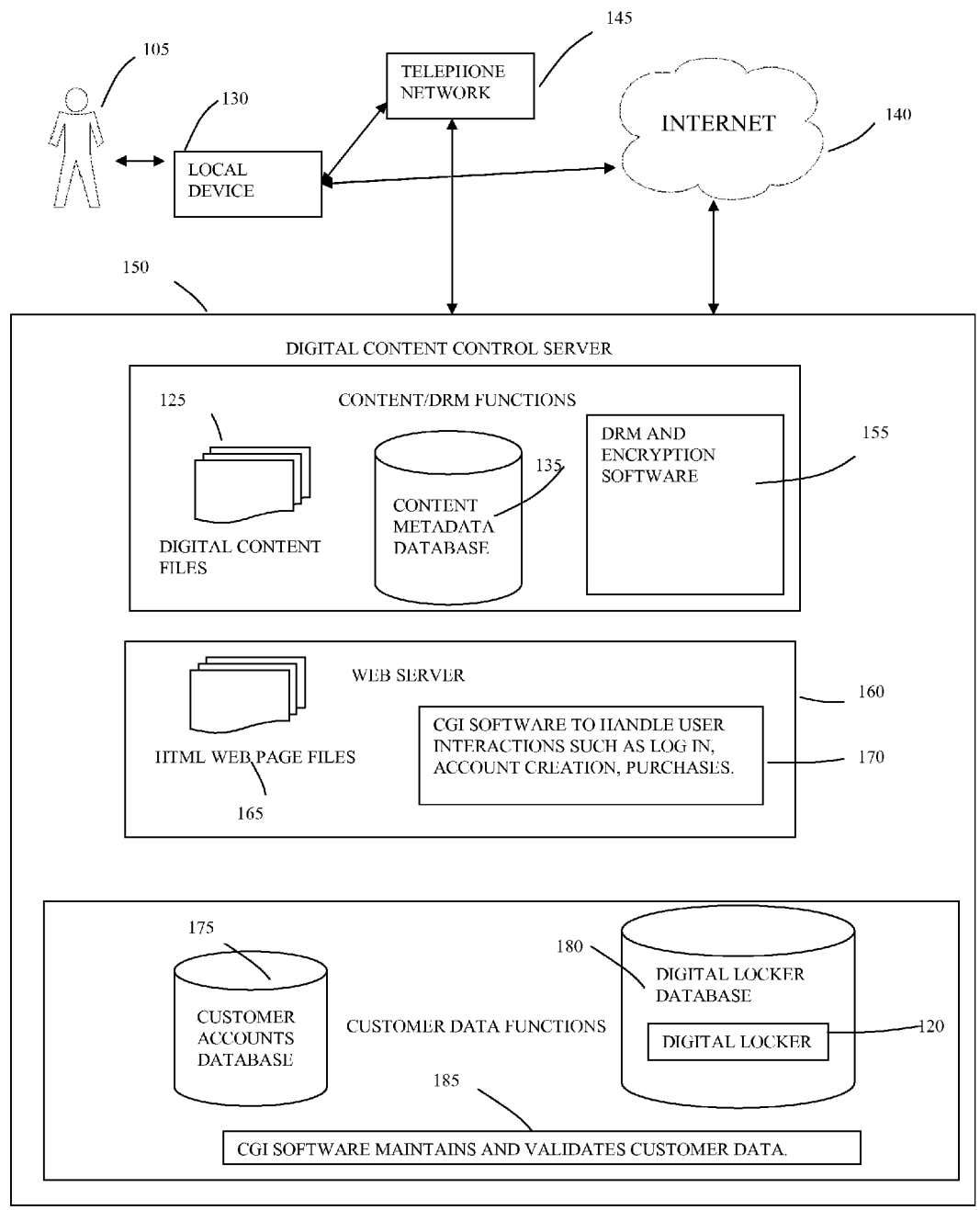
FIG. 1 illustrates a system according to the present invention.

FIG. 1 shows components of digital content control system in which the present invention can operate. User 105 is an authorized user of the digital content control system of the present invention. Many of the functions of digital content control system are carried out on digital content control server 150. As appreciated by those skilled in the art, many of the functions described herein can be divided between the digital content control server 150 and the user's local device 130. Further, as also appreciated by those skilled in the art, digital content control server 150 can be considered a "cloud" with respect to the user 105 and his local device 130. The cloud can actually be comprised of several servers performing interconnected and distributed functions. The user 105 can connect to the digital content control server 150 via the Internet 140, a telephone network 145 (e.g., a wireless cellphone network) or other suitable electronic communication channels. User 105 has an account on digital content control server 150, which authorizes user 105 to use the digital content control system.

Associated with the user's 105 account is the user's 105 digital locker 120 located in a Digital Locker Database 180 on the digital content control server 150. As further described below, in the preferred embodiment, digital locker 120 contains links to copies of digital content 125 purchased or otherwise legally acquired by user 105.

Indicia of rights to all copies of digital content 125 owned by user 105 are stored by reference in digital locker 120. Digital locker 120 is a remote online repository that is uniquely associated with the user's 105 account. As appreciated by those skilled in the art, the actual copies of the digital content 125 purchased by user 105 are not necessarily stored in the user's locker 120, but rather the locker 120 stores an indication of the rights of the user to the particular content 125 and a link or other reference to the actual digital content 125. Typically, the actual copy of the digital content 125 is stored in another mass storage (not shown). The digital lockers 120 of all of the users 105 who have purchased a copy of a particular digital content 125 would point to this copy in mass storage. Of course, back up copies of all digital content 125 are maintained for disaster recovery purposes.

Although only one example of digital content 125 is illustrated in this Figure, it is appreciated that the digital content control server can contain millions of files 125 containing digital content. It is also contemplated that the digital content control server 150 can actually be comprised of several servers with access to a plurality of storage devices containing digital content 125. As further appreciated by those skilled in the art, in conventional licensing programs, the user does not own the actual copy of the digital content, but has a license to use it. Hereinafter, if reference is made to "owning" the digital content, it is understood what is meant is the license or right to use the content.

User 105 can access his or her digital locker 120 using a local device 130. Local device 130 is an electronic device such as a personal computer, an eBook reader, a smart phone or other electronic device that the user 105 can use to access the digital content control server 150. In a preferred embodiment, the local device 130 has been previously associated or registered with the user's 105 account using user's 105 account credentials. Local device 130 provides the capability for user 105 to download the user's copy of digital content 125 via his or her digital locker 120. After digital content 125 is downloaded to local device 130, user 105 can engage with the downloaded content locally, e.g., read the book, listen to the music or watch the video.

In a preferred embodiment, local device 130 includes a non-browser based user interface subsystem that allows user 105 to initiate the purchase of digital content 125 in a non-browser environment. Through the device interface, the user 105 is automatically connected to the digital content control server 150 in a non-browser based environment. This connection to the digital content control server is a secure interface and can be through the telephone network 145, typically a wireless cellular network for mobile devices. If user 105 is accessing his or her digital locker 120 using the Internet 140, local device 130 also includes a web account user interface subsystem. Web account interface provides user 105 with browser-based access to his or her account and digital locker 120 over the Internet 140. Web interface allows user 105 to initiate the purchase of digital content 125 in a browser based environment. Local device 130 further includes an input output subsystem that provides the interface between the local device 130 and the remote server 150. Local device 130 also includes an operating system that is operable to control the operations of the local device 130.

FIG. 1 further illustrates the detailed components of digital content control server 150. Digital content control server 150 handles front-end functions related to web server operations and user interactions with the web and device interfaces in connection with the user's local devices 130. Digital content control server 150 also handles all backend functions related to managing accounts, maintaining digital locker records, maintaining content metadata and providing encryption services.

Digital content control server 150 provides both the browser based web interface and the non browser based device interface. User 105 may engage with the web interface or the device interface to initiate a purchase.

Digital content control server 150 employs web server 160 including web services interface software 170 to handle interactions between front-end components, such as device interface, web account interface, and web interface, and back-end database components of the system. Web server 160 services include serving up the web pages 165 that comprise the web account interface and the web interface, and the underlying web services associated with the device interface. Web services interface software 170 includes handling users' logins to their accounts and processing the initiation of and response to purchase requests.

Back-end database components of digital content control server 150 includes customer accounts database 175, digital lockers database 180, and content metadata database 135. Records for users' accounts are stored and managed in customer accounts database 175. Records for digital lockers 120 are stored and managed in digital lockers database 180. Content metadata database 135 serves as a source of metadata for individual digital content items 125 in digital content control server 150.

Web services interface software 170 in the web server 160 interfaces with customer data services 185 to update customer accounts database 175 and digital lockers database 180. Customer data services 185 processes database updates such as maintaining and validating customer data in users' accounts. Web services interface software 170 in the web server 160 also interfaces with content encryption services 155 to secure certain communications with local device 130 and to package digital content 125 for secure delivery to user 105.

In the preferred embodiment of the invention, digital content control server 150 is an eBook and periodical digital content control system. Although the eBook and digital periodical applications are the preferred embodiment, as appreciated by those skilled in the art, the digital content control server 150 of the present invention is not limited to user 105 purchasing and using eBooks or digital publications. Digital content control server 150 can be used for purchase and use of any digital content, such as digital movies, digital music, digital audio books, digital pictures or other downloadable digital content.

In the preferred embodiment of the invention, local device 130 is a mobile electronic reader (eReader) device. The embodiment of the invention is not intended to limit local device 130 to a mobile eReader device. Local device 130 may be a desktop personal computer or another type of mobile consumer electronic device, such as, for example, a cell phone, a laptop computer, a tablet computer or other mobile digital device.

Figure 2A:
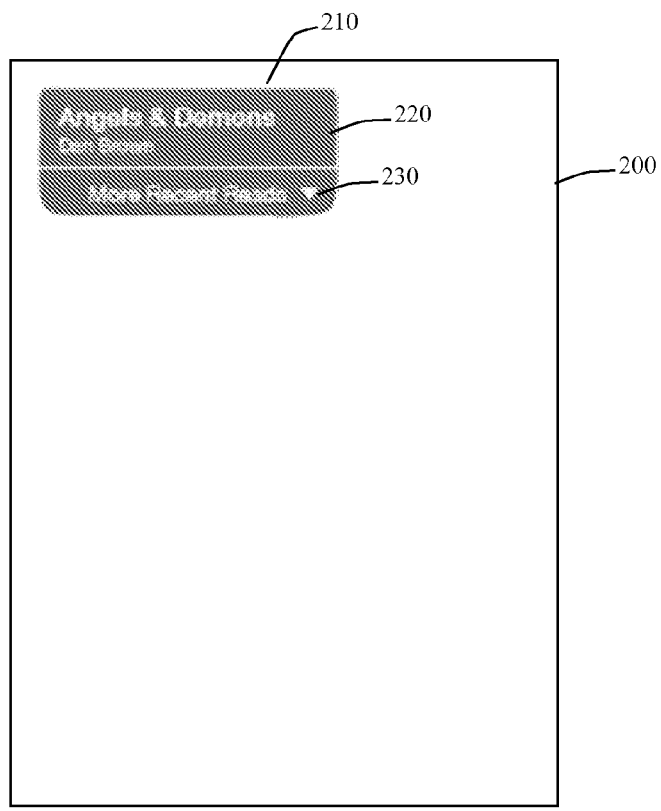
FIGS. 2A and 2B illustrate the closed and opened state of a menu in accordance with the present invention.

In preferred embodiment, the present invention operates on a user's local device 130. The menu or list of the present invention appears on the user interface of device 130. The 'Recently Read' menu has two different basic states, either opened or closed. The closed state menu 210 is illustrated in FIG. 2A. In a preferred embodiment, the menus of the present invention appear in the corner on a home screen 200 on the device. The home screen 200 can be the basic home screen of the device 130, the home screen on the native reader application, or the home screen of other applications.

In the closed state menu 210, the most recently read item 220 in any category is listed in the menu 210. In order to open and read this item 220, the user simply taps (assuming a touch screen) on the item 220 to open it. In a preferred embodiment, the item 220 is opened to the last page that was being viewed by the user 105. Below the most recently read item 220 is a button 230, which expands the closed state 'Recently Read' menu 210 into the open state menu 240 as illustrated in FIG. 2B.

Figure 2B:
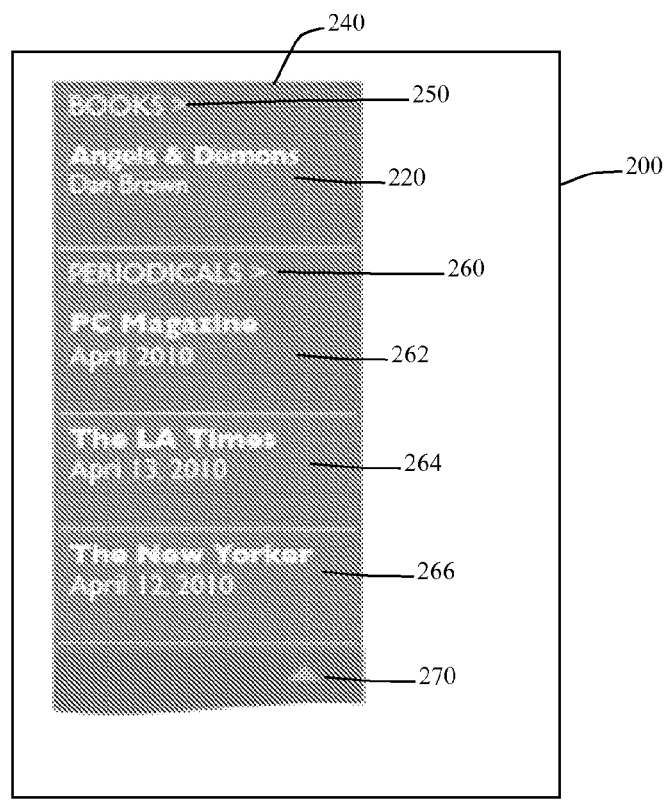

As shown in FIG. 2B, the open, expanded 'Recently Read' menu 240 on interface 200 includes categories 250, 260, for different types of materials. Category 250 is the Book category, and lists the book 220 most recently read by the user 105. In the embodiment illustrated in FIG. 2B, only the most recent book read by the user is listed, as it is less likely that the user would have two unfinished books at any given time (as opposed to two or more unfinished newspapers or magazines.) One of the functions of the present invention is to allow the user 105 to easily and quickly locate and open the material that she wants to read. This is most likely the material that she has already started reading. Tapping on the title of the Category, e.g., Books 250 opens the user's library application on device 130 to the book section, where the user 105 can view of her books. Similarly, tapping on the Periodical 260 link opens the library to the periodical section where the user can view her periodicals.

In the examples of the items read by user 105 illustrated in FIG. 2B, a hypothetical user 105 read the following items in the following order over the weekend:

"Angels & Demons" by Dan Brown

The New Yorker (April 12)

The LA Times (April 12)
The LA Times (April 13)
PC Magazine (April edition)

As shown in FIG. 2B, book 220, Angels & Demons, is at the top of the list in the Books category 250 as it was the book most recently opened by the user 105. Similarly, PC Magazine 262 is at the top of the Periodical category 260 as it was most recently read periodical. Below PC Magazine 262 the April 13th issue of the LA Times 264 is listed and then the April 12th edition of the New Yorker Magazine 266. Although the user 105 read the April 12th issue of the LA Times more recently than the issue of the New Yorker Magazine 266, in the preferred embodiment, the present invention does not list it on menu 240 since the April 13th issue of the LA Times 264 is already issued. The operating assumption is that the user can use other navigating tools from the April 13th issue of the LA Times 264 or the periodicals section of the library application to gain access to the April 12th issue of the same periodical. For example, the present invention has a "Find related items in the series" search feature. This search feature allows the user, for example, to find yesterday's newspaper while reading today's newspaper.

Button 270 can be used to collapse the open menu 240 back in the closed state 210 as illustrated in FIG. 2A. Further, tapping any place other than on menu 240 on screen 200 closes menu 240.

Figure 3A:
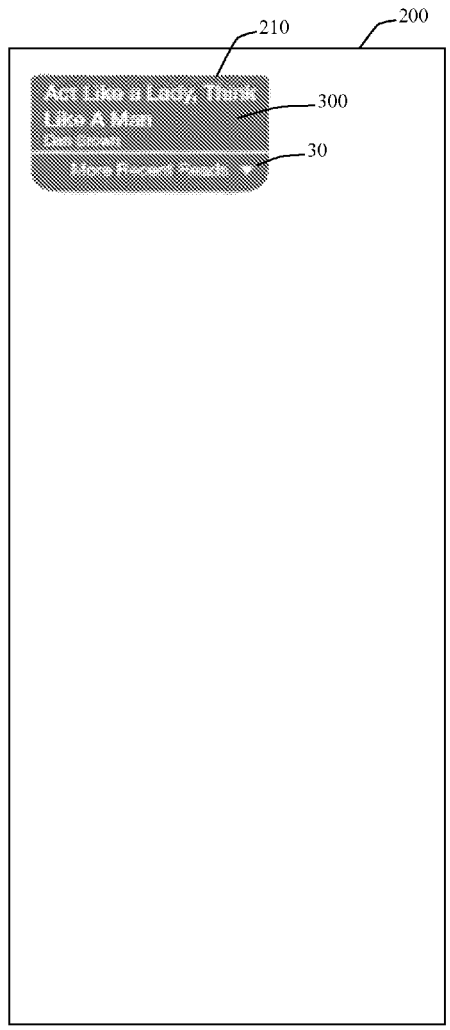
FIGS. 3A and 3B depict a further example of the closed and opened state of the menu.
Figure 3B:
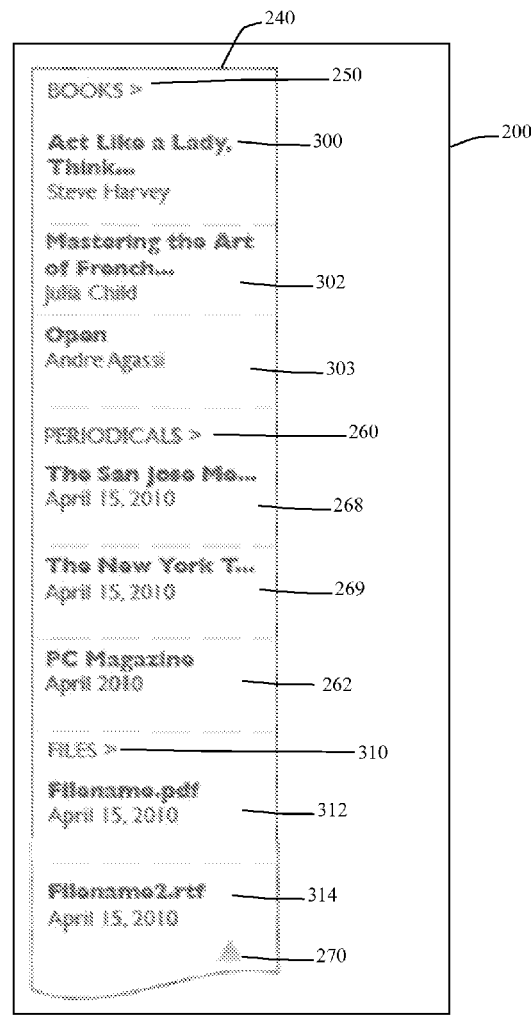

Continuing with the example of the hypothetical user 105, this same user continued to read the following items in this order:
"Open" by Andre Agassi
"Mastering the Art of French Cooking" by Julia Child
The New York Times (April 15)
The San Jose Mercury News (April 15)
"Act Like a Lady, Think Like A Man" by Steve Harvey As shown in FIG. 3A, in the closed state the user's 'Recently Read" menu 210 lists the book 300 "Act Like a Lady, Think Like A Man" by Steve Harvey as it was the last item read by the user 105. If the user 105 clicks on the expand button 230 on the closed menu 210, the reading list is expanded as illustrated in FIG. 3B. As seen in FIG. 3B, the PC magazine 262 was pushed down in the Periodical category 260 as the user subsequently read the San Jose Mercury News 268 and New York Times 269 newspapers. In the present embodiment, newspapers and magazine are both grouped in the single generic category Periodicals 260. As described above, the Periodical category 260 can further be broken down into sub-categories such as newspapers and magazines. In one embodiment, the sub-categories are configurable by the user 105.

As further shown in FIG. 3B, the Dan Brown book Angels & Demons (220 in FIGS. 2A, 2B) was pushed off the list 240 because the user had subsequently opened three other books 300, 302, 303. In a preferred embodiment, each of the categories, e.g., Books 250, Periodicals 260, has a predefined number of recently read items that it can display. In one embodiment, the number of items that can be displayed is configurable by the user 105.

As further shown in FIG. 3B, the menu 240 also includes a category for Files 310. This category 310 includes other types of items such as pdf or rtf files or other types of files that can be opened and accessed by the user 105 using the device 130.

Some of the rules adopted for formatting the menus 210, 240 in a preferred embodiment of the present invention are described in Table 1 illustrated in FIG. 4.

The menu of the present invention makes it easy to return to books, magazines, or newspapers last read. The present invention thus prevents periodicals, which tend to be read more frequently, from pushing books off of the 'Recently Reading Now' list.

Figure 5:
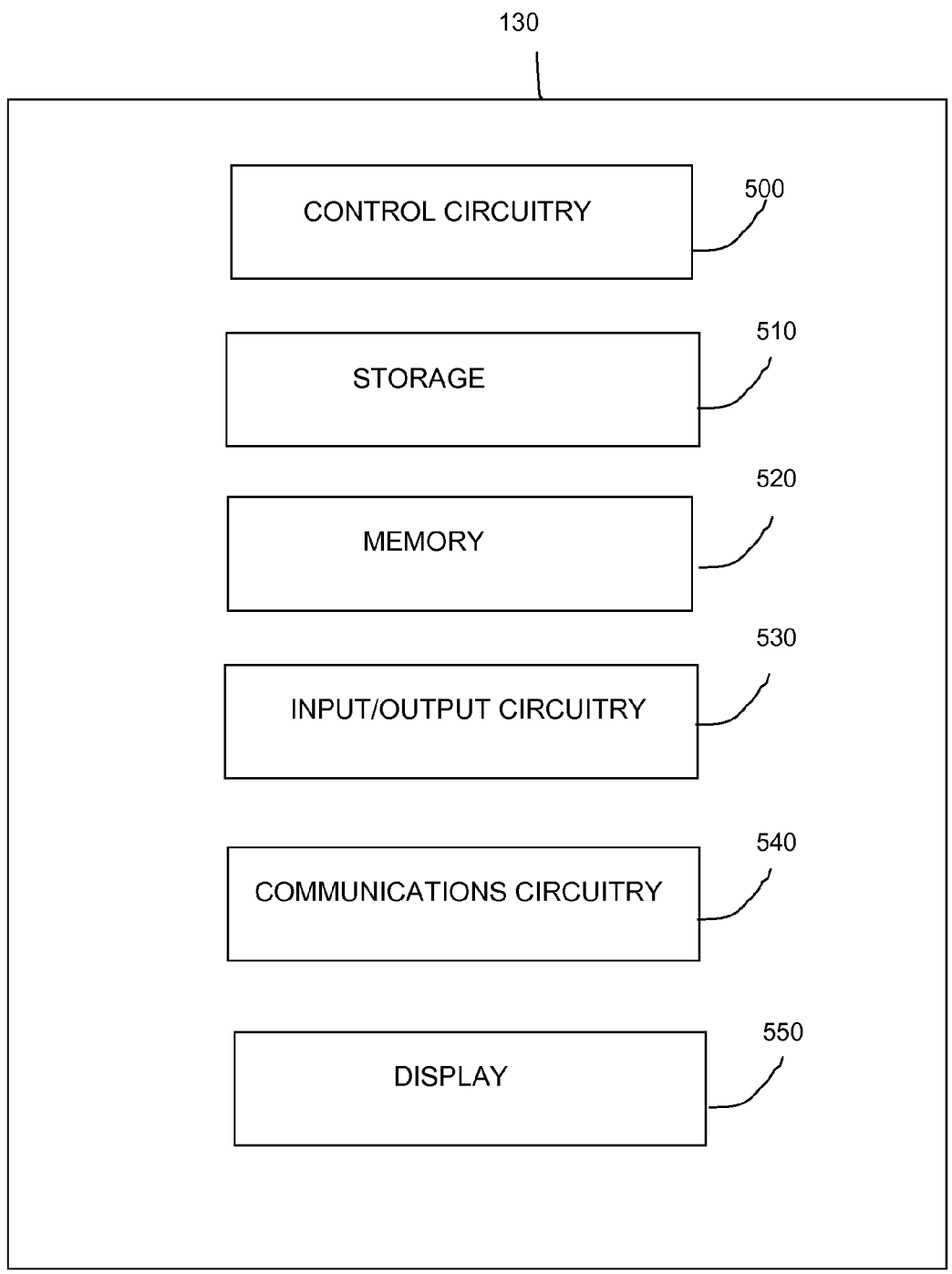
FIG. 5 illustrates an exemplary local device.

FIG. 5 illustrates an exemplary local device 130. As appreciated by those skilled the art, the local device 130 can take many forms capable of operating the present invention. As previously described, in a preferred embodiment the local device 130 is a mobile electronic device, and in an even more preferred embodiment device 130 is an electronic reader device. Electronic device 130 can include control circuitry 500, storage 510, memory 520, input/output ("I/O") circuitry 530, communications circuitry 540, and display 550. In some embodiments, one or more of the components of electronic device 130 can be combined or omitted, e.g., storage 510 and memory 520 may be combined. As appreciated by those skilled in the art, electronic device 130 can include other components not combined or included in those shown in FIG. 5, e.g., a power supply such as a battery, an input mechanism, etc.

Electronic device 130 can include any suitable type of electronic device. For example, electronic device 130 can include a portable electronic device that the user may hold in his or her hand, such as a digital media player, a personal e-mail device, a personal data assistant ("PDA"), a cellular telephone, a handheld gaming device, a tablet device or an eBook reader. As another example, electronic device 130 can include a larger portable electronic device, such as a laptop computer. As yet another example, electronic device 130 can include a substantially fixed electronic device, such as a desktop computer.

Control circuitry 500 can include any processing circuitry or processor operative to control the operations and performance of electronic device 130. For example, control circuitry 500 can be used to run operating system applications, firmware applications, media playback applications, media editing applications, or any other application. Control circuitry 500 can drive the display 550 and process inputs received from a user interface, e.g., the display 550 if it is a touch screen.

Storage 510 can include, for example, one or more storage mediums including a hard-drive, solid state drive, flash memory, permanent memory such as ROM, any other suitable type of storage component, or any combination thereof. Storage 510 can store, for example, media content, e.g., eBooks, music and video files, application data, e.g., software for implementing functions on electronic device 130, firmware, user preference information data, e.g., content preferences, authentication information, e.g. libraries of data associated with authorized users, transaction information data, e.g., information such as credit card information, wireless connection information data, e.g., information that can enable electronic device 130 to establish a wireless connection, subscription information data, e.g., information that keeps track of podcasts or television shows or other media a user subscribes to, contact information data, e.g., telephone numbers and email addresses, calendar information data, and any other suitable data or any combination thereof.

Memory 520 can include cache memory, semi-permanent memory such as RAM, and/or one or more different types of memory used for temporarily storing data. In some embodiments, memory 520 can also be used for storing data used to operate electronic device applications, or any other type of data that can be stored in storage 510. In some embodiments, memory 520 and storage 510 can be combined as a single storage medium.

I/O circuitry 530 can be operative to convert, and encode/decode, if necessary analog signals and other signals into digital data. In some embodiments, I/O circuitry 530 can also convert digital data into any other type of signal, and vice-versa. For example, I/O circuitry 530 can receive and convert physical contact inputs, e.g., from a multi-touch screen, i.e., display 550, physical movements, e.g., from a mouse or sensor, analog audio signals, e.g., from a microphone, or any other input. The digital data can be provided to and received from control circuitry 500, storage 510, and memory 520, or any other component of electronic device 130. Although I/O circuitry 530 is illustrated in FIG. 5 as a single component of electronic device 130, several instances of I/O circuitry 530 can be included in electronic device 130.

Electronic device 130 can include any suitable interface or component for allowing a user to provide inputs to I/O circuitry 530. For example, electronic device 130 can include any suitable input mechanism, such as a button, keypad, dial, a click wheel, or a touch screen, e.g., display 550. In some embodiments, electronic device 130 can include a capacitive sensing mechanism, or a multi-touch capacitive sensing mechanism.

In some embodiments, electronic device 130 can include specialized output circuitry associated with output devices such as, for example, one or more audio outputs. The audio output can include one or more speakers, e.g., mono or stereo speakers, built into electronic device 130, or an audio component that is remotely coupled to electronic device 130, e.g., a headset, headphones or earbuds that can be coupled to device 130 with a wire or wirelessly.

Display 550 includes the display and display circuitry for providing a display visible to the user. For example, the display circuitry can include a screen, e.g., an LCD screen, that is incorporated in electronics device 130. In some embodiments, the display circuitry can include a coder/decoder (Codec) to convert digital media data into analog signals. For example, the display circuitry or other appropriate circuitry within electronic device 1 can include video Codecs, audio Codecs, or any other suitable type of Codec.

The display circuitry also can include display driver circuitry, circuitry for driving display drivers, or both. The display circuitry can be operative to display content, e.g., media playback information, application screens for applications implemented on the electronic device 130, information regarding ongoing communications operations, information regarding incoming communications requests, or device operation screens, under the direction of control circuitry 500. Alternatively, the display circuitry can be operative to provide instructions to a remote display.

Communications circuitry 540 can include any suitable communications circuitry operative to connect to a communications network and to transmit communications, e.g., data from electronic device 130 to other devices within the communications network. Communications circuitry 540 can be operative to interface with the communications network using any suitable communications protocol such as, for example, Wi-Fi, e.g., a 802.11 protocol, Bluetooth, radio frequency systems, e.g., 900 MHz, 1.4 GHz, and 5.6 GHz communication systems, infrared, GSM, GSM plus EDGE, CDMA, quadband, and other cellular protocols, VOIP, or any other suitable protocol.

Electronic device 130 can include one more instances of communications circuitry 540 for simultaneously performing several communications operations using different communications networks, although only one is shown in FIG. 5 to avoid overcomplicating the drawing. For example, electronic device 130 can include a first instance of communications circuitry 540 for communicating over a cellular network, and a second instance of communications circuitry 540 for communicating over Wi-Fi or using Bluetooth. In some embodiments, the same instance of communications circuitry 540 can be operative to provide for communications over several communications networks.

In some embodiments, electronic device 130 can be coupled a host device such as digital content control server 150 for data transfers, synching the communications device, software or firmware updates, providing performance information to a remote source, e.g., providing riding characteristics to a remote server, or performing any other suitable operation that can require electronic device 130 to be coupled to a host device. Several electronic devices 130 can be coupled to a single host device using the host device as a server. Alternatively or additionally, electronic device 130 can be coupled to several host devices, e.g., for each of the plurality of the host devices to serve as a backup for data stored in electronic device 130.

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

We claim:

1. A method, performed by a computer processor, for organizing and displaying digital content on a device comprising:
   identifying digital content that was recently opened on the device, the identified digital content being denoted as recently opened digital content;
   determining a type of the recently opened digital content, wherein the type of the recently opened digital content comprises digital books and digital periodicals;
   sorting the recently opened digital content by type, the sorted recently opened digital content being denoted as type sorted recently opened digital content;
   further sorting the type sorted recently opened digital content by date, the further sorted type sorted recently opened digital content being denoted as type and date sorted recently opened digital content;
   displaying on the device the type and date sorted recently opened digital content, each type of recently opened digital content being displayed on a separate portion of a menu on the device by date;
   sorting the type sorted recently opened digital content by sub-type, the sorted type sorted recently opened digital content being denoted as sub type sorted recently opened digital content;
   further sorting the sub type sorted recently opened digital content by date, the further sorted sub type sorted recently opened digital content being denoted as sub type and date sorted recently opened digital content; and
   separately displaying each sub-type of recently opened digital content on a separate portion of the menu on the device by date.

2. The method according to claim 1 further comprising:
   allocating a predetermined number of positions for recently opened digital content in each separate portion of the menu.

3. The method according to claim 2, wherein the predetermined number of positions is three.

4. The method according to claim 1, wherein the act of determining the type of the recently opened digital content further comprises examining metadata associated with the recently opened digital content.

5. The method according to claim 1, wherein one type of digital content is periodical digital content, the method further comprising:

displaying only a single issue of a particular periodical digital content, even if several issues of the particular periodical digital content have been recently opened.

6. The method according to claim 1, further comprising:
receiving from a user a selection of a displayed recently opened digital content; and
opening the selected digital content on the device.

7. A method, performed by a computer processor, for organizing and displaying digital content on a device comprising:
identifying digital content that was recently opened on the device, the identified digital content being denoted as recently opened digital content;
displaying a single item of digital content that was most recently opened on the device, the single item being displayed on a closed state of a menu;
determining a type of the recently opened digital content, wherein the type of the recently opened digital content comprises digital books and digital periodicals;
sorting the recently opened digital content by type, the sorted recently opened digital content being denoted as type sorted recently opened digital content;
sorting the type sorted recently opened digital content by sub-type, the sorted type sorted recently opened digital content being denoted as sub type sorted recently opened digital content;
further sorting the sub type sorted recently opened digital content by date, the further sorted sub type sorted recently opened digital content being denoted as sub type and date sorted recently opened digital content; and
displaying on the device recently opened digital content, each sub-type of recently opened digital content being displayed separately on an opened state of the menu.

8. The method according to claim 7, further comprising:
providing a user activated control on the closed state of the menu, the control expanding the menu from the closed state to the opened state.

9. The method according to claim 7, wherein the act of displaying further comprises displaying each type of recently opened digital content on a separate portion of the opened state of the menu.

10. The method according to claim 7, wherein the act of determining the type of the recently opened digital content further comprises examining metadata associated with the recently opened digital content.

11. The method according to claim 7, further comprising:
receiving from a user a selection of a displayed recently opened digital content; and
opening the selected digital content on the device.

12. A device for organizing and displaying periodical digital content comprising:
a display;
a memory,
the memory storing items of digital content; and
control circuitry coupled to the display and coupled to the memory, the control circuitry operated to:
identify digital content that was recently opened on the device, the identified digital content being denoted as recently opened digital content;
determine a type of the recently opened digital content, wherein the type of the recently opened digital content comprises digital books and digital periodicals;
sort the recently opened digital content by type, the sorted recently opened digital content being denoted as type sorted recently opened digital content;
further sort the type sorted recently opened digital content by date, the further sorted type sorted recently opened digital content being denoted as type and date sorted recently opened digital content;
display on the device the type and date sorted recently opened digital content, each type of recently opened digital content being displayed on a separate portion of a menu on the device by date;
sort the type sorted recently opened digital content by sub-type, the sorted type sorted recently opened digital content being denoted as sub type sorted recently opened digital content;
further sort the sub type sorted recently opened digital content by date, the further sorted sub type sorted recently opened digital content being denoted as sub type and date sorted recently opened digital content; and
separately display each sub-type of recently opened digital content on a separate portion of the menu on the device by date.

* * * * *